US006896291B1

(12) United States Patent
Peterson

(10) Patent No.: US 6,896,291 B1
(45) Date of Patent: May 24, 2005

(54) PERSONAL RESTRAINT SYSTEM

(76) Inventor: Beverly M. Peterson, 81 Houston St., Ashville, NC (US) 28801

(*) Notice: Subject to any disclaimer, the term of this patent is extended or adjusted under 35 U.S.C. 154(b) by 0 days.

(21) Appl. No.: 10/122,912

(22) Filed: Apr. 12, 2002

(51) Int. Cl.[7] .......................... B60R 22/14; B60R 22/24
(52) U.S. Cl. .......................... 280/808; 280/748; 2/462; 297/465
(58) Field of Search ................................ 280/748, 808; 297/464, 465, 484; 2/102, 462

(56) References Cited

U.S. PATENT DOCUMENTS

| 3,618,975 A | * | 11/1971 | Bombach ..................... 280/808 |
| 4,145,074 A | | 3/1979 | Hendricks |
| 4,191,400 A | * | 3/1980 | Smith ......................... 280/808 |
| 4,563,023 A | | 1/1986 | Clarkson |
| 4,570,974 A | | 2/1986 | Dove |
| 5,161,522 A | * | 11/1992 | Clevenger ................... 297/484 |
| D339,217 S | | 9/1993 | Mccue et al. |
| 5,544,363 A | | 8/1996 | Mccue et al. |
| 5,579,785 A | * | 12/1996 | Bell ......................... 280/801.1 |
| 5,730,498 A | | 3/1998 | Hanson et al. |

* cited by examiner

Primary Examiner—Peter C. English

(57) ABSTRACT

A personal restraint system includes a central mounting assembly that is couplable to an interior surface of a vehicle. The central mounting assembly has a base member. The central mounting assembly has a rotatable coupling portion that is rotatably coupled to the base member. An elongate member has a first and second end. The first end is operationally couplable to the rotatable coupling portion. A harness assembly is operationally couplable to the second end of the elongate member. The elongate member is providing vertical support for a user when the harness assembly is worn by the user and the harness assembly is coupled to the central mounting assembly via the elongate member. The harness member is for inhibiting unwanted movement of the user relative to the interior of the vehicle.

3 Claims, 5 Drawing Sheets

PERSONAL RESTRAINT SYSTEM

BACKGROUND OF THE INVENTION

1. Field of the Invention

The present invention relates to restraint systems and more particularly pertains to a new personal restraint system for providing a safety restraint system for paramedics and emergency medical technicians than can be worn within moving emergency medical vehicles.

2. Description of the Prior Art

The use of restraint systems is known in the prior art. U.S. Pat. No. 5,544,363 describes an ambulance attendant's safety vest and harness. Another type of restraint system is U.S. Pat. No. 4,563,023 describing a ambulance safety stabilizer harness for paramedics. U.S. Pat. No. 4,145,074 describes an automotive body harness for being secured to a portion of a vehicle above to a point to the rear of the drivers head. U.S. Pat. No. 5,730,498 describes a quick release closure assembly. U.S. Pat. No. 4,570,974 describes a safety vest for use by personnel in the compartment of a moving vehicle such as an ambulance. U.S. Pat. No. Des. 339,217 describes an ornamental design for an ambulance attendants harness and vest combination.

While these devices fulfill their respective, particular objectives and requirements, the need remains for a system that includes a means for controlling the harness keeping it out of the users way during use.

SUMMARY OF THE INVENTION

The present invention meets the needs presented above by incorporating a centrifugal clutch for inhibiting rapid movement of the elongate member while permitting slow movement of the elongate member whereby unwanted motion is inhibited.

Another object of the present invention is to provide a new personal restraint system that would keep the caregiver safe while remaining secure in the event of a mishap.

Still another object of the present invention is to provide a new personal restraint system that would allow the care giver peace of mind allowing them to focus on giving medical care to the patient.

To this end, the present invention generally comprises a central mounting assembly that is couplable to an interior surface of a vehicle. The central mounting assembly has a base member. The central mounting assembly has a rotatable coupling portion that is rotatably coupled to the base member. An elongate member has a first and second end. The first end is operationally couplable to the rotatable coupling portion. A harness assembly is operationally couplable to the second end of the elongate member. The elongate member is providing vertical support for a user when the harness assembly is worn by the user and the harness assembly is coupled to the central mounting assembly via the elongate member. The harness member is for inhibiting unwanted movement of the user relative to the interior of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
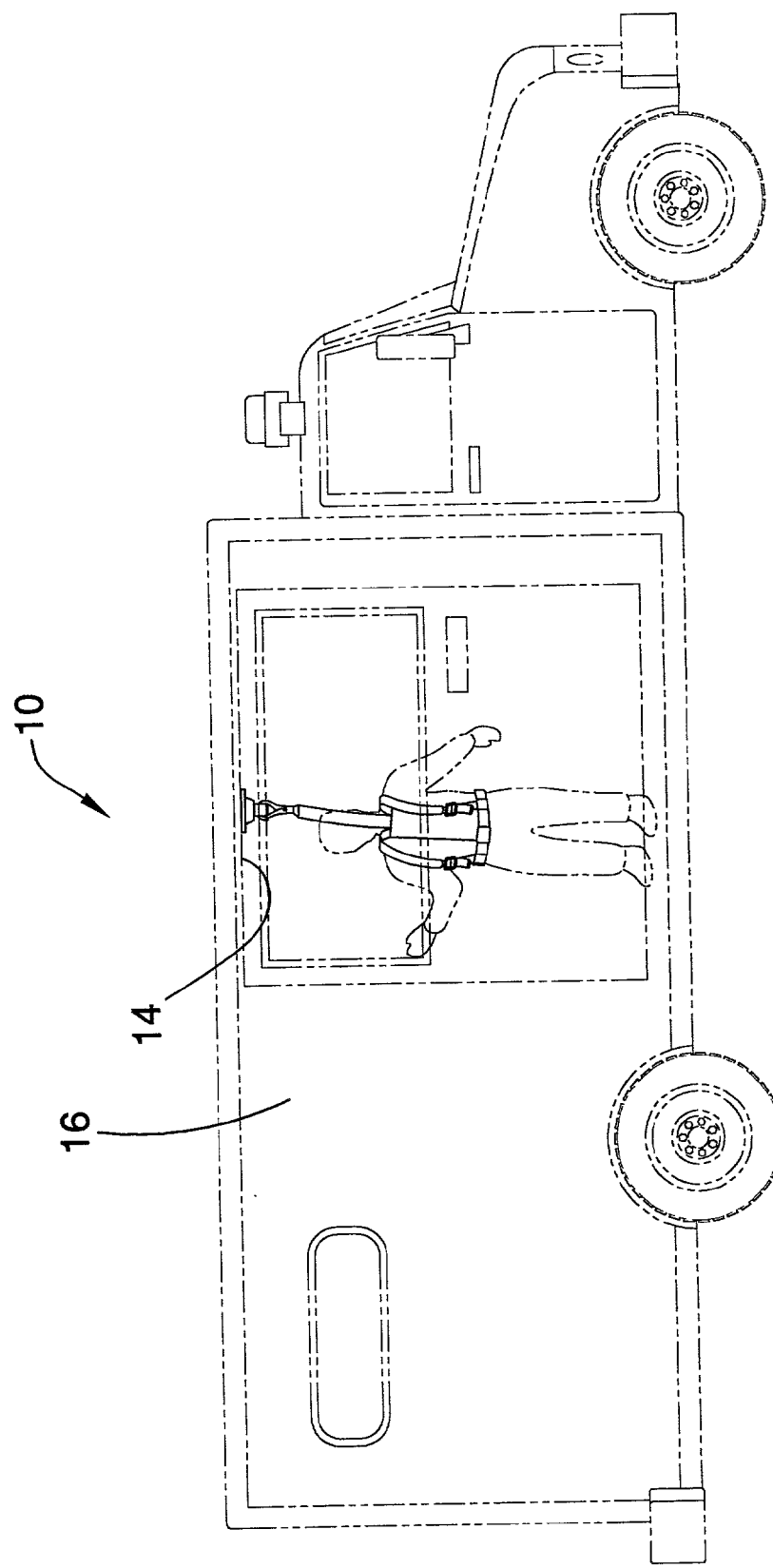
FIG. 1 is a in-use view of a new personal restraint system according to the present invention.
Figure 2:
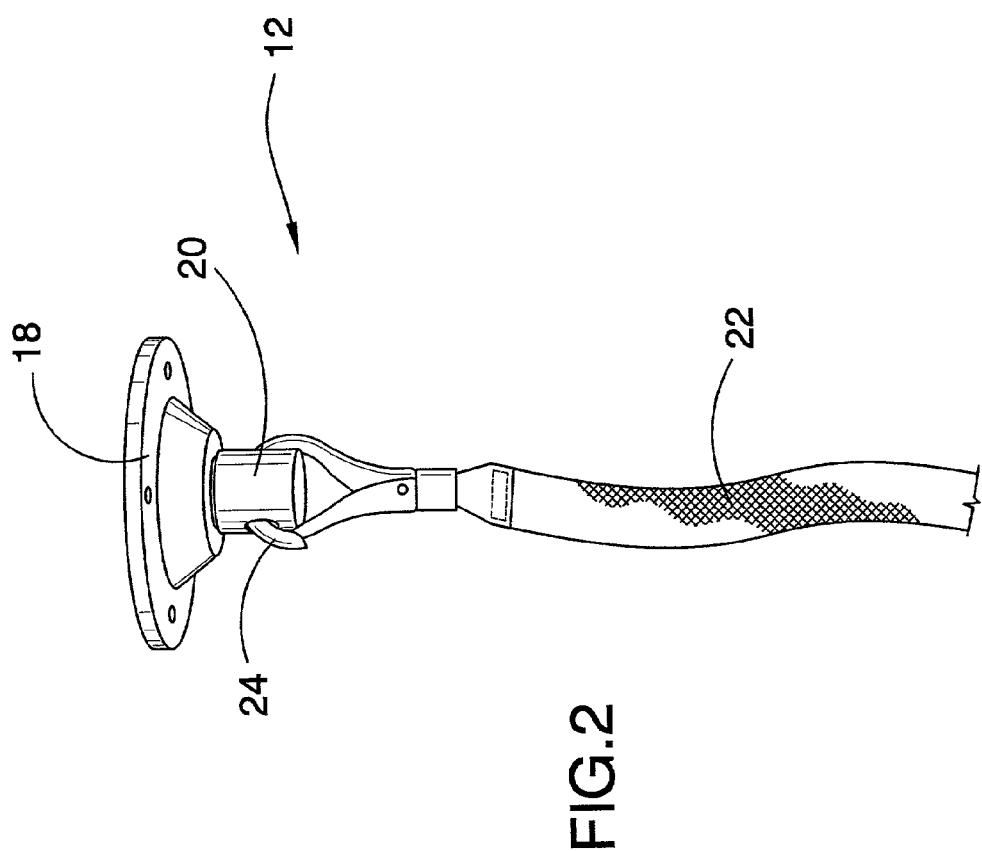
FIG. 2 is a perspective view of the present invention.
Figure 3:
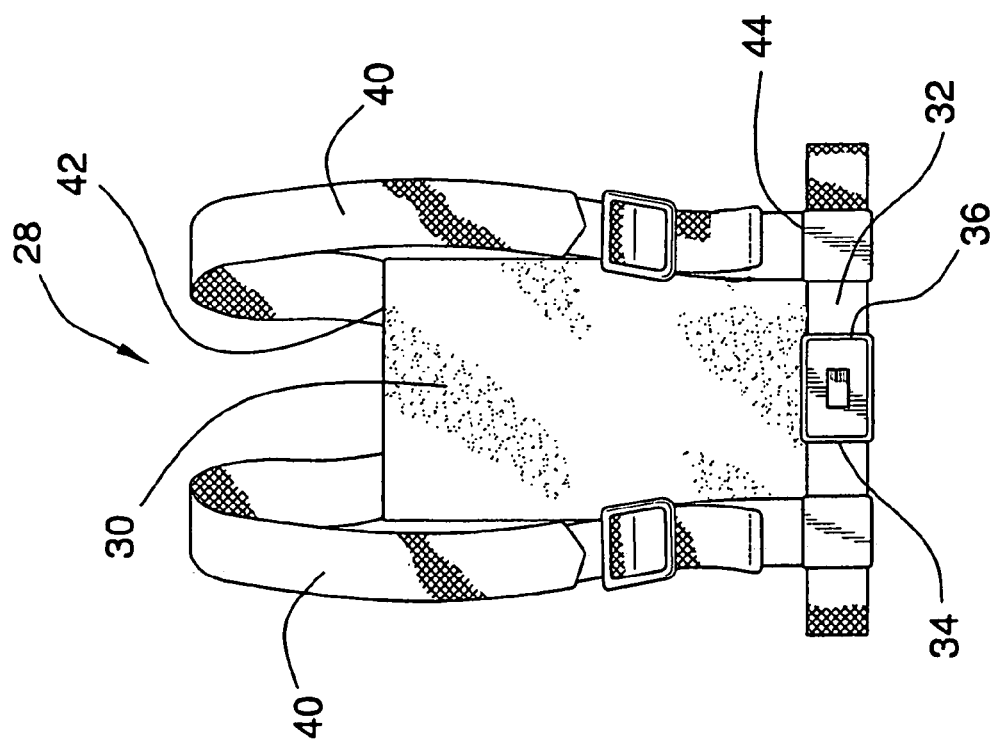
FIG. 3 is a front view of the present invention.
Figure 4:
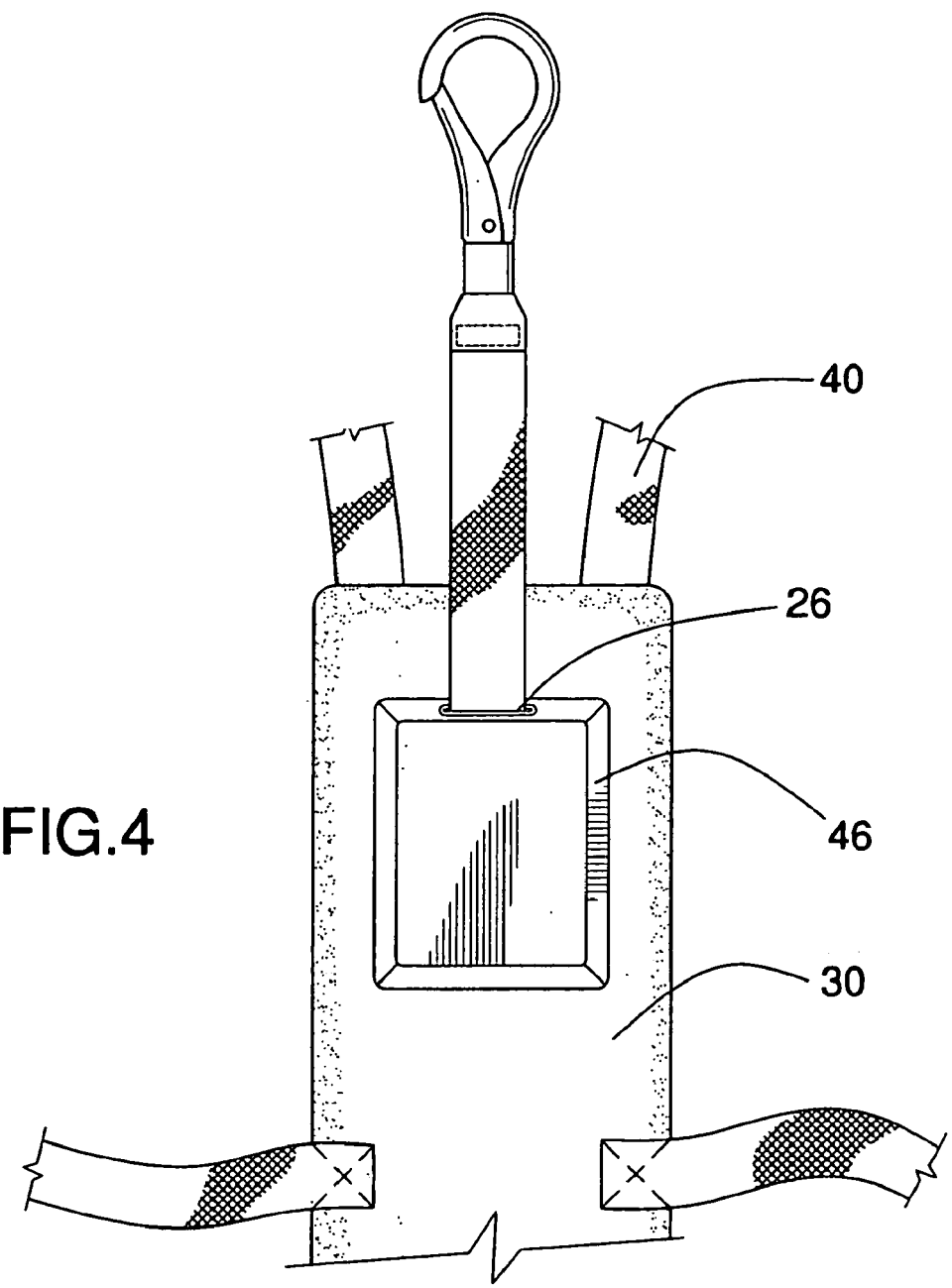
FIG. 4 is a rear view of the present invention.
Figure 5:
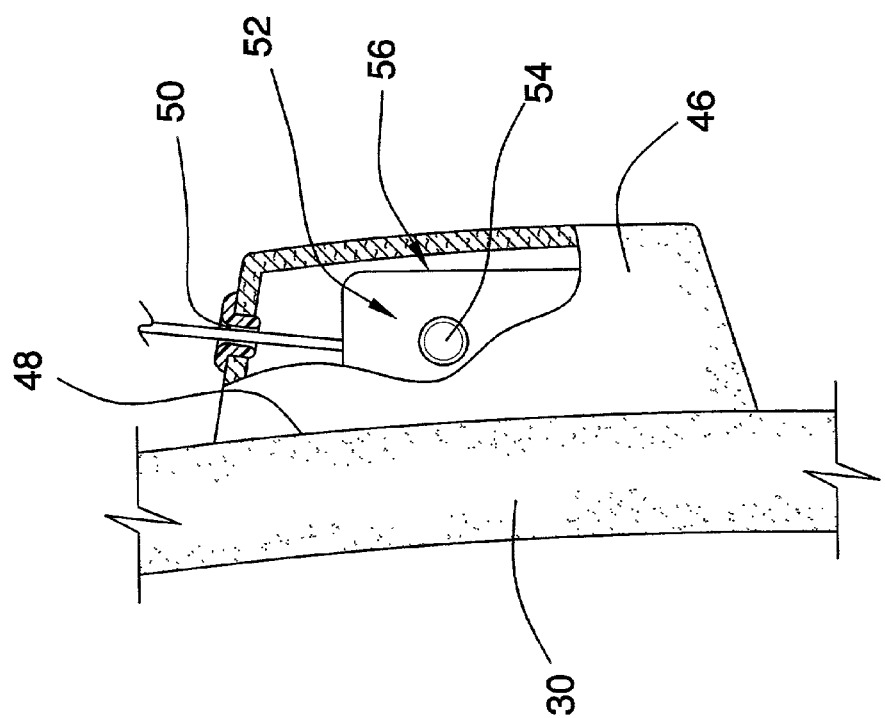
FIG. 5 is a cut-away view of the present invention.

With reference now to the drawings, and in particular to FIGS. 1 through 5 thereof, a new personal restraint system embodying the principles and concepts of the present invention and generally designated by the reference numeral 10 will be described.

As best illustrated in FIGS. 1 through 5, the personal restraint system 10 generally comprises a central mounting assembly 12 that is couplable to an interior surface 14 of a vehicle 16. The central mounting assembly 12 has a base member 18. The central mounting assembly 12 has a rotatable coupling portion 20 that is rotatably coupled to the base member 18. An elongate member 22 has a first 24 and second 26 end. The first end 24 is operationally couplable to the rotatable coupling portion 20. A harness assembly 28 is operationally couplable to the second end 26 of the elongate member 22. The elongate member 22 provides vertical support for a user when the harness assembly 28 is worn by the user and the harness assembly 28 is coupled to the central mounting assembly 12 via the elongate member 22. The harness member is for inhibiting unwanted movement of the user relative to the interior of the vehicle 16.

A central panel 30 is designed for abutting a back of the user. A belt member 32 has a first 34 and second 36 belt end. The belt member 32 is coupled to the central panel 30. The belt member 32 is designed for selectively securing the harness assembly 28 to a waist of a user. Each of a pair of shoulder members 40 has a first shoulder end 42 and a second shoulder end 44. The first shoulder end 42 is couplable to the central panel 30. The second shoulder end 44 is slideably coupled to the belt member 32. The shoulder member 40 is designed for abutting an associated shoulder and chest portion of the user. The shoulder member 40 is for securing the harness assembly 28 to an upper portion of a torso of the user.

The harness assembly 28 further includes a spool housing 46 that is coupled to a second surface 48 of the central panel 30. The spool housing 46 has a spool slot 50 that extends therethrough. The spool slot 50 is for receiving the second end 26 of the elongate member 22. A spool assembly 52 is positioned substantially within the spool housing 46. The spool assembly 52 is for retaining an excess portion of the elongate member 22 such that a length of the elongate member 22 is adjustable.

A spool member 54 is positioned substantially within the spool housing 46. The spool member 54 is for selectively receiving an excess of the elongate member 22. A centrifugal clutch assembly 56 is operationally coupled to the spool member 54. The centrifugal clutch assembly 56 is positioned substantially within the housing. The centrifugal clutch 56 is for inhibiting rapid movement of the elongate member 22 while permitting slow movement of the elongate member 22 whereby unwanted motion is inhibited.

In use, a user would buckle the harness around their torso securing the belt portion and the shoulder members respectively. The user would then clip the strap on the back portion of the harness into the base member, thus securing the user to the base member.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A personnel restraint system for use in conjunction with moving vehicles, comprising:
    a central mounting assembly couplable to an interior surface of a vehicle, said central mounting assembly having a base member, said central mounting assembly having a rotatable coupling portion rotatably coupled to said base member;
    an elongate member having a first and second end, said first end being releasably coupled to said rotatable coupling portion; and
    a harness assembly coupled to said second end of said elongate member, said elongate member providing vertical support for a user when said harness assembly is worn by the user and said harness assembly is coupled to said central mounting assembly via said elongate member, said harness assembly being for inhibiting unwanted movement of the user relative to the interior of the vehicle;
    wherein said harness assembly further comprises:
        a central panel being adapted for abutting a back of the user;
        a belt member having a first and second belt end, said belt member being coupled to said central panel, said belt member being adapted for selectively securing said harness assembly to a waist of the user;
        a pair of shoulder members, each one of said shoulder members having a first shoulder end and a second shoulder end, said first shoulder ends being coupled to said central panel, said second shoulder ends being slideably coupled to said belt member, each said shoulder member being adapted for abutting an associated shoulder and chest portion of the user, said shoulder members being for securing said harness assembly to an upper portion of a torso of the user;
        a spool housing coupled to a surface of said central panel, said spool housing having a spool slot extending therethrough, said spool slot receiving said second end of said elongate member; and
        a spool assembly positioned substantially within said spool housing, said spool assembly retaining an excess portion of said elongate member such that a length of said elongate member is adjustable.

2. The system of claim 1, wherein said spool assembly further comprises:
    a spool member positioned substantially within said spool housing, said spool member being for selectively receiving an excess portion of said elongate member.

3. Personnel restraint system for use in conjunction with moving vehicles, comprising:
    a central mounting assembly couplable to an interior surface of a vehicle, said central mounting assembly having a base member, said central mounting assembly having a rotatable coupling portion rotatably coupled to said base member;
    an elongate member having a first and second end, said first end being releasably coupled to said rotatable coupling portion; and
    a harness assembly coupled to said second end of said elongate member, said elongate member providing vertical support for a user when said harness assembly is worn by the user and said harness assembly is coupled to said central mounting assembly via said elongate member, said harness assembly being for inhibiting unwanted movement of the user relative to the interior of the vehicle;
    wherein said harness assembly comprises a central panel being adapted for abutting a back of the user;
    a belt member having a first and second belt end, said belt member being coupled to said central panel, said belt member being adapted for selectively securing said harness assembly to a waist of the user, and
    a pair of shoulder members, each one of said shoulder members having a first shoulder end and a second shoulder end, said first shoulder ends being coupled to said central panel, said second shoulder ends being slideably coupled to said belt member, each said shoulder member being adapted for abutting an associated shoulder and chest portion of the user, said shoulder members being for securing said harness assembly to an upper portion of a torso of the user;
    wherein said harness assembly further comprises:
        a spool housing coupled to a surface of said central panel, said spool housing having a spool slot extending therethrough, said spool slot receiving said second end of said elongate member;
        a spool assembly positioned substantially within said spool housing, said spool assembly retaining an excess portion of said elongate member such that a length of said elongate member is adjustable; and
        wherein said spool assembly further comprises:
            a spool member positioned substantially within said spool housing, said spool member being for selectively receiving an excess portion of said elongate member.

* * * * *